United States Patent [19]

Kitamura et al.

[11] Patent Number: 4,739,204

[45] Date of Patent: Apr. 19, 1988

[54] LIQUID COOLED A.C. VEHICLE GENERATOR

[75] Inventors: Yutaka Kitamura; Kazutoshi Kaneyuki; Yoshiyuki Iwaki; Hiroaki Aso, all of Himeji, Japan

[73] Assignee: Mitsubishi Denki Kabushiki Kaisha, Tokyo, Japan

[21] Appl. No.: 348

[22] Filed: Jan. 5, 1987

[30] Foreign Application Priority Data

| Jan. 30, 1986 | [JP] | Japan | 61-20627 |
| Jan. 30, 1986 | [JP] | Japan | 61-20628 |
| Jan. 30, 1986 | [JP] | Japan | 61-20629 |
| Feb. 12, 1986 | [JP] | Japan | 61-28422 |
| Mar. 13, 1986 | [JP] | Japan | 61-55593 |
| Mar. 18, 1986 | [JP] | Japan | 61-62061 |
| Mar. 18, 1986 | [JP] | Japan | 61-62062 |
| Mar. 18, 1986 | [JP] | Japan | 61-62065 |

[51] Int. Cl.[4] .............................. H02K 9/19
[52] U.S. Cl. ..................... 310/68 D; 123/41.31; 310/54
[58] Field of Search ............ 123/41.31, 41.33, 195 A, 123/196 R, 198 C, 198 DA; 310/54, 68 R, 68 D, 87

[56] References Cited

U.S. PATENT DOCUMENTS

| 2,414,532 | 1/1947 | Johns et al. | 310/89 |
| 3,733,503 | 5/1973 | Potter | 310/68 D |
| 4,221,982 | 9/1980 | Raver et al. | 310/54 |
| 4,262,224 | 4/1981 | Kofink et al. | 310/68 D |
| 4,293,788 | 10/1981 | Binder | 310/68 D |
| 4,464,593 | 8/1984 | Kofink | 310/60 R |

FOREIGN PATENT DOCUMENTS 59-83557 5/1984 Japan.

*Primary Examiner*—Patrick R. Salce
*Assistant Examiner*—D. L. Rebsch
*Attorney, Agent, or Firm*—Sughrue, Mion, Zinn, Macpeak and Seas

[57] ABSTRACT

A vehicle mounted a.c. generator includes an annular water coolant passage 32b around a stator coil 11 and a branch coolant passage 32c extending from an inlet portion of the annular coolant passage to a return portion thereof. An air circulation fan 60 may also be provided inside a front bracket 26 of the generator. Various embodiments include supplemental heat pipes and bearing coolant passages.

16 Claims, 16 Drawing Sheets

LIQUID COOLED A.C. VEHICLE GENERATOR

BACKGROUND OF THE INVENTION

This invention relates to a vehicle mounted a.c. generator adapted to be driven by the engine of the vehicle, and particularly to an improved cooling system thereof.

A cross section of a conventional vehicle mounted a.c. generator is shown in FIG. 1, in which a pulley 2 and a rotor 3 are secured to a rotary shaft 1. The rotor 3 is composed of a rotor core 4 mounted on the shaft 1, a magnetic pole member 5 having a plurality of angularly spaced teeth 5a formed peripherally thereof, a support ring 6 of non-magnetic material fixedly secured to an inner periphery of the teeth 5a, and an opposite magnetic pole member 7 fixedly secured to the support ring 6 and having a plurality of angularly spaced teeth 7a which are interleaved with the teeth 5a. A stationary exciting core 8 is arranged between the core 4 and the member 7 and defines air gaps therewith, and supports an exciting coil 9.

The generator further includes a stator core 10 which supports a stator coil 11 in slots thereof, a front bracket 12 which supports the shaft 1 through a bearing 14, outlet holes 12a formed in the bracket 12, and a rear bracket 13 for supporting, together with the front bracket 12, the stator core 10 and the shaft 1 through a bearing 15. The bracket 13 also fixedly supports the core 8, and has inlet ports 13a for cooling air. A rectifier 16 converts a.c. power produced in the stator coil 11 into d.c. power. A voltage regulator 17 detects the generator voltage and controls the exciting current to thereby regulate the terminal voltage to a predetermined value. A fan 18 is fixed to the shaft 1.

In this conventional a.c. generator, the shaft 1 is rotated by the engine through a belt and the pulley 2. Upon rotation of the shaft 1, an a.c. voltage is induced in the stator coil 11 which is rectified by the rectifier 16 and regulated by the voltage regulator 17, the resultant d.c. voltage being supplied to the exciting coil 9 and to a load such as a battery.

Cooling air drawn through the inlet ports 13a of the rear bracket 13 by the rotation of the fan 18 cools the interior of the generator, and is discharged through the outlet ports 12a of the front bracket 12.

In such a generator, heat generated by the exciting coil 9, stator coil 11, bearings 14 and 15 and voltage regulator 16 housed in the bracket 13 is discharged by the air flow mentioned above. However, it is usually insufficient to cool the inside of the bracket 13 by means of the fan 18. In order to obtain a sufficient cooling effect it is possible to use a larger fan. However, such a large fan is noisy. Further, since the air used to cool the generator tends to degrade the insulation of various portions thereof, the use of an air coolant passing through the inside of the generator should be minimized. In addition, the power required to drive such a large fan is considerable.

SUMMARY OF THE INVENTION

A primary object of the present invention is to provide a vehicle mounted a.c. generator which restricts noise to a minimum level while providing sufficient cooling.

Another object of the invention is to provide a vehicle mounted a.c. generator having a simplified cooling system with minimized noise and power loss.

In order to achieve these objects, a vehicle mounted a.c. generator is provided with cooling passages extending along an outer periphery of the stator coil and along other portions of the generator in which large heat is generated, through which a liquid coolant circulates. The liquid coolant may be a portion of the engine coolant.

DETAILED DESCRIPTION OF THE PREFERRED EMBODIMENTS

Figure 1:
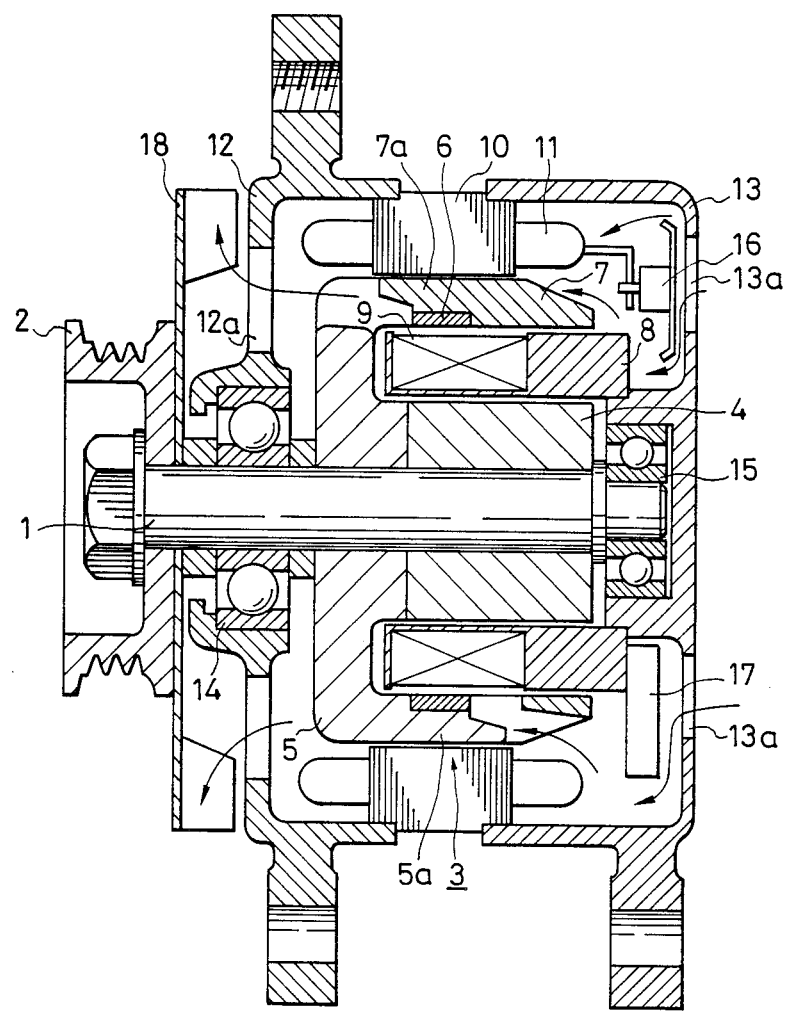
FIG. 1 is a cross section of a conventional vehicle mounted a.c. generator.
Figure 2:
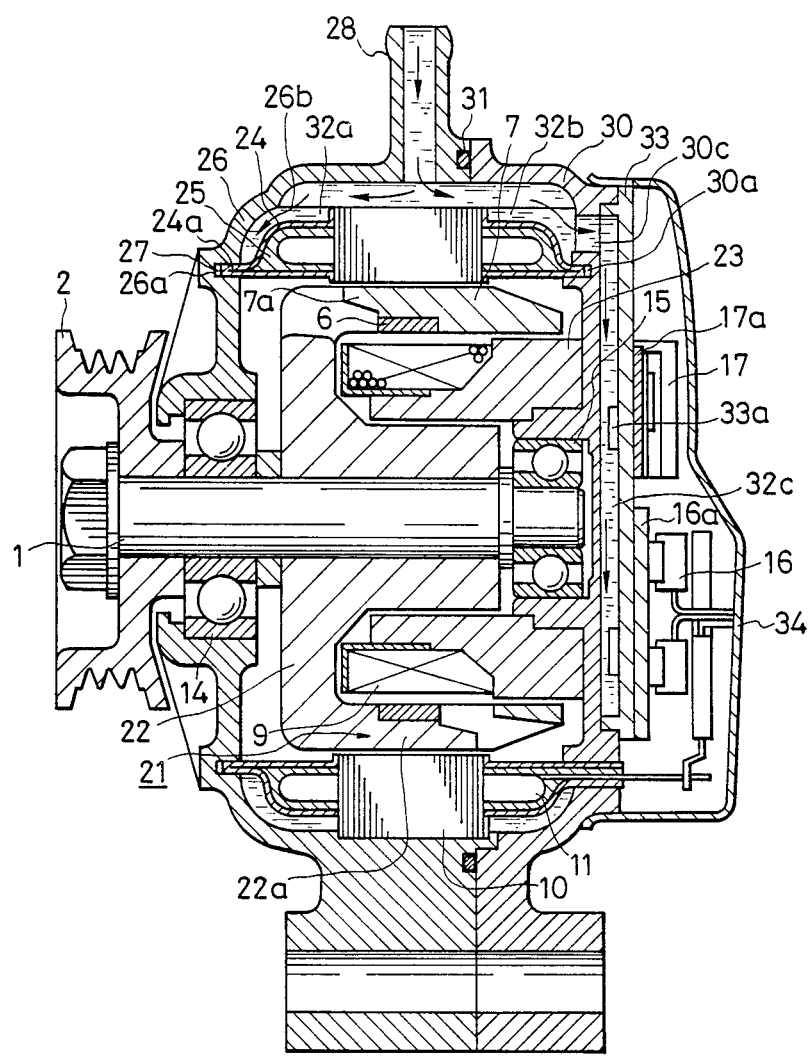
FIG. 2 is a cross section of an embodiment of the invention.
Figure 3:
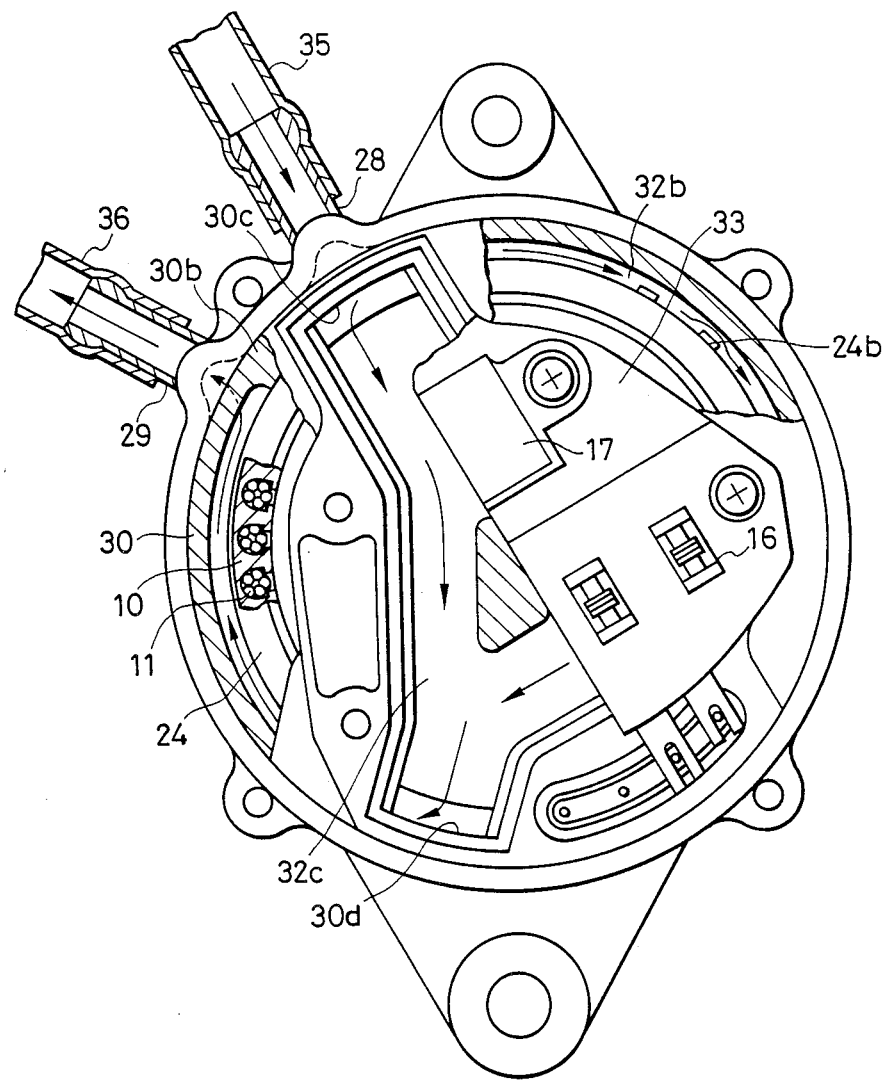
FIG. 3 is a partially cut away front view of a main portion of the embodiment shown in FIG. 2.

In FIGS. 2 and 3, reference numerals 1, 2, 6, 7, 7a, 9-11 and 14-17 depict the same components as those of the conventional generator shown in FIG. 1, respectively, and therefore descriptions of these components are omitted to avoid duplication. Reference numeral 21 depicts a rotor composed of a magnetic pole member 22 fixedly secured to the shaft 1 and having a plurality of angularly spaced teeth 22a provided on a periphery thereof which are interleaved with teeth 7a of the opposite magnetic pole member 7.

A stationary exciting core 23 is arranged between the magnetic pole member 22 and the opposite magnetic pole member 7 with air gaps therebetween, and supports an exciting coil 9. An enclosure 24 formed of a metal such as aluminum having a high thermal conductivity surrounds the cylindrical stator coil 11. An insulating filler 25 such as synthetic resin fills the spaces between the enclosure 24 and the opposite ends of the stator coil 11 to provide a liquid-tight connection to the stator core 10, to thereby protect the stator coil from the liquid coolant. A plurality of heat radiating fins 24b are circumferentially formed in opposite ends of the inner wall of the enclosure 24, as shown in FIG. 3.

A front bracket 26 supports the stator core 10 and is formed on an inner surface thereof with an annular groove 26a in which a flange 24a of one end of the enclosure 24 fits liquid-tightly, with an aid of a gasket 27 of a material such as a viscous silicon compound, to form a pair of annular coolant passages 32a extending peripherally thereof between the enclosure 24 and the inner wall of the bracket 26. The front bracket 26 is provided with a coolant inlet pipe 28 and a coolant outlet pipe 29 between which a partition 26b is provided. A tube 35 is connected to the coolant inlet pipe 28 to supply a portion of the engine coolant from an outgoing portion of the engine cooling system, and a tube 36 is connected to the outlet pipe 29 to return the coolant to the cooling system. A rear bracket 30 is fixedly secured through an O-ring 31 to the front bracket 26, and is formed on an inner surface thereof with a groove 30a in which the flange 24a of the other end of enclosure 24 fits liquid-tightly with aid of a viscous gasket 27. The rear bracket 30 fixedly supports the core 23 and the bearing 15. The bracket 30 is formed with a coolant branch inlet port 30c and a return port 30d. A coolant passage 32b is formed between the inner wall of the rear bracket 30 and an outer surface of the enclosure 24, and a partition 30b is also formed to separate the incoming side from the outgoing side.

A cooling cover 33 of a metal having good thermal conductivity is liquid-tightly mounted on an outer end portion of the rear bracket 30, between which a branch passage 32c is formed through which the coolant from the branch port 30c flows. The coolant is then returned through the return port 30d to the passage 32b. A plurality of heat radiating fins 33a are arranged on an inner surface of the cooling cover 33 along the flow direction of the coolant. A rectifier 16 is fixedly secured through a heat sink 16a to an outer surface of the cooling cover 33, and a voltage regulator 17 is also secured through a heat sink 17a thereto. A protection cover 34 is mounted to the rear bracket 30.

The cooling effect obtained by the cooling system mentioned above will now be described. A portion of the coolant of the vehicle engine, which is at a relatively low temperature, is used for cooling the generator. The coolant flows from the inlet pipe 28 through the passages 32a and 32b as shown by arrows to cool the stator core 10 and the stator coil 11. The coolant, whose temperature has now risen, is discharged through the outlet pipe 29 to the return path of the engine coolant circulation system.

A portion of the coolant flowing through the inlet pipe 28 into the passage 32b passes through the branch port 30c and the branch passage 32c to cool the rectifier 16 and the voltage regulator 17 indirectly through the cooling cover 33, and is then returned to the passage 32b as shown by arrows.

The front bracket 26, which is cooled directly by the coolant, absorbs heat generated in the bearing 14, and the rear bracket 30, which is also cooled directly, absorbs heat generated in the bearing 15 and in the exciting coil 9 through the core 23.

The heat radiating fins 24b provided on the respective ends of the enclosure 24 and the heat radiating fins 33a provided on the cooling cover 33 increase the heat exchange effect and hence the cooling effect.

It may be possible to use a separate coolant circulation system instead of the path from the passage 32b through the branch passage 32c.

Thus, the stator coil 11, the rectifier 16, the voltage regulator 17 and the energizing coil 9 which produce large quantities of heat are cooled effectively, so that the temperatures thereof are substantially restricted without using a noisy fan cooler.

Figure 4:
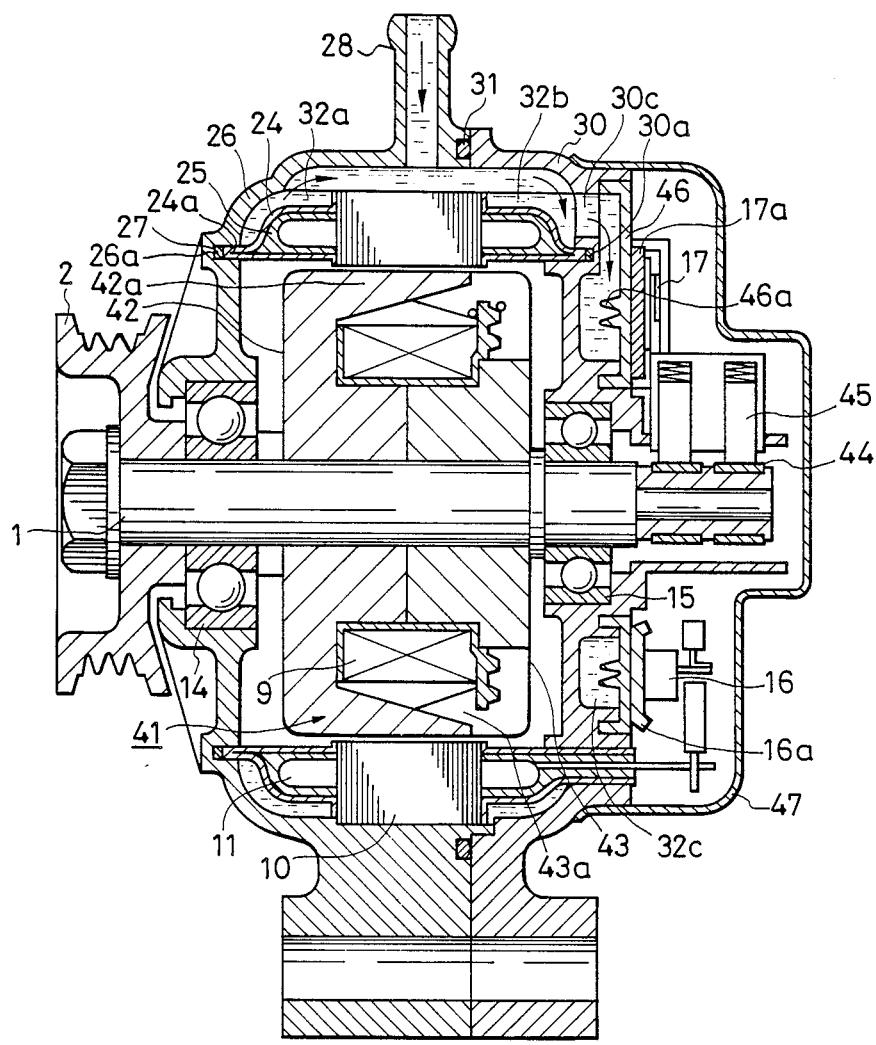
FIG. 4 is a cross section of another embodiment of the invention.

FIG. 4 shows a second embodiment of the invention in which components shown by the same reference numerals as used in FIGS. 2 and 3 are the same components as those in the first embodiment. A rotor 41 is composed of opposite pole cores 42 and 43 fixedly secured to a rotor shaft 1 and an exciting coil 9 supported thereby. A plurality of teeth 42a protruding from the pole core 42 are interleaved with a plurality of teeth 43a protruding from the core 43 as in the first embodiment. A brush device 45 supplies electric power to slip-rings 44 connected to the exciting coil 9. A cooling cover 46 is liquid-tightly mounted to a rear bracket 30 to form a branch passage 32c therebetween, and a rectifier 16 and a voltage regulator 17 are mounted on the cooling cover 46 with protection cover 47.

The front and rear brackets 26 and 30 are directly cooled by the coolant, and internal air cooled by these brackets is agitated by the rotation of the rotor 41 to cool the exciting coil 9 effectively.

Figure 5:
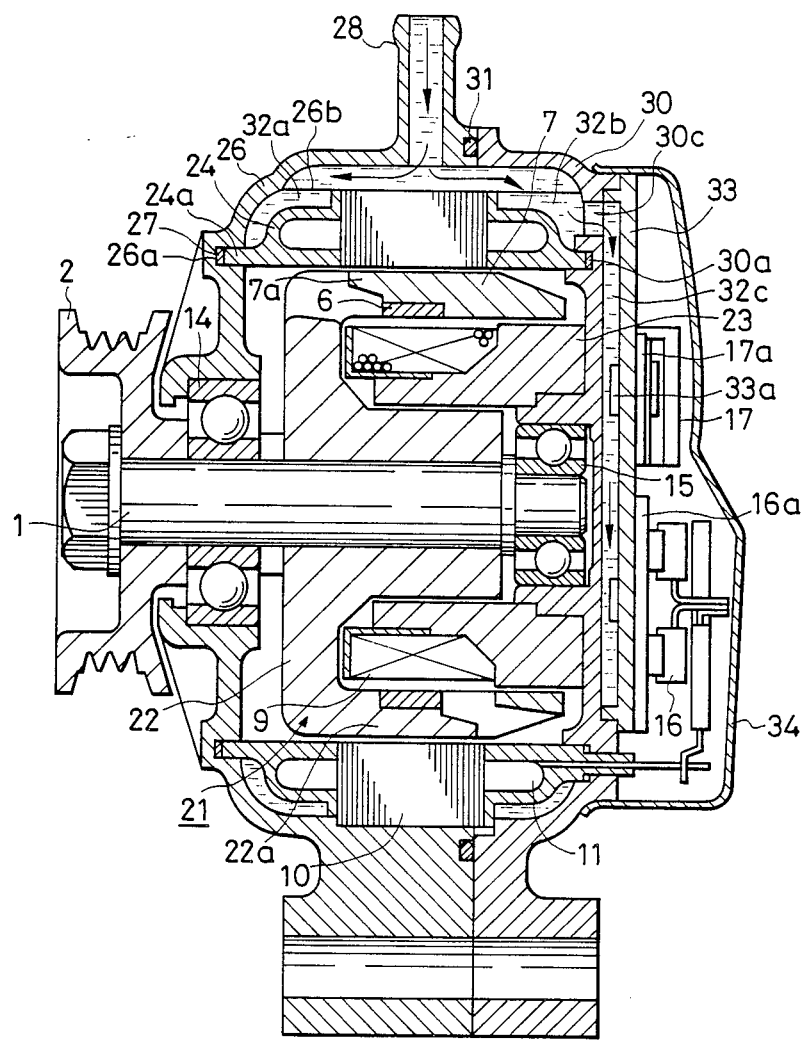
FIGS. 5, 6, 7 and 8 are cross sections of other embodiments of the invention.

In the embodiment shown in FIGS. 2 and 3, the stator coil 11 is covered by the enclosure 24 of good thermal conductivity, and the enclosure is filled with resin. In a third embodiment shown in FIG. 5, however, the stator coil 11 is enclosed directly by an insulating synthetic resin mold and supported liquid-tightly by front and rear brackets 26, 30 so that coolant passages 32a and 32b are formed.

Figure 6:
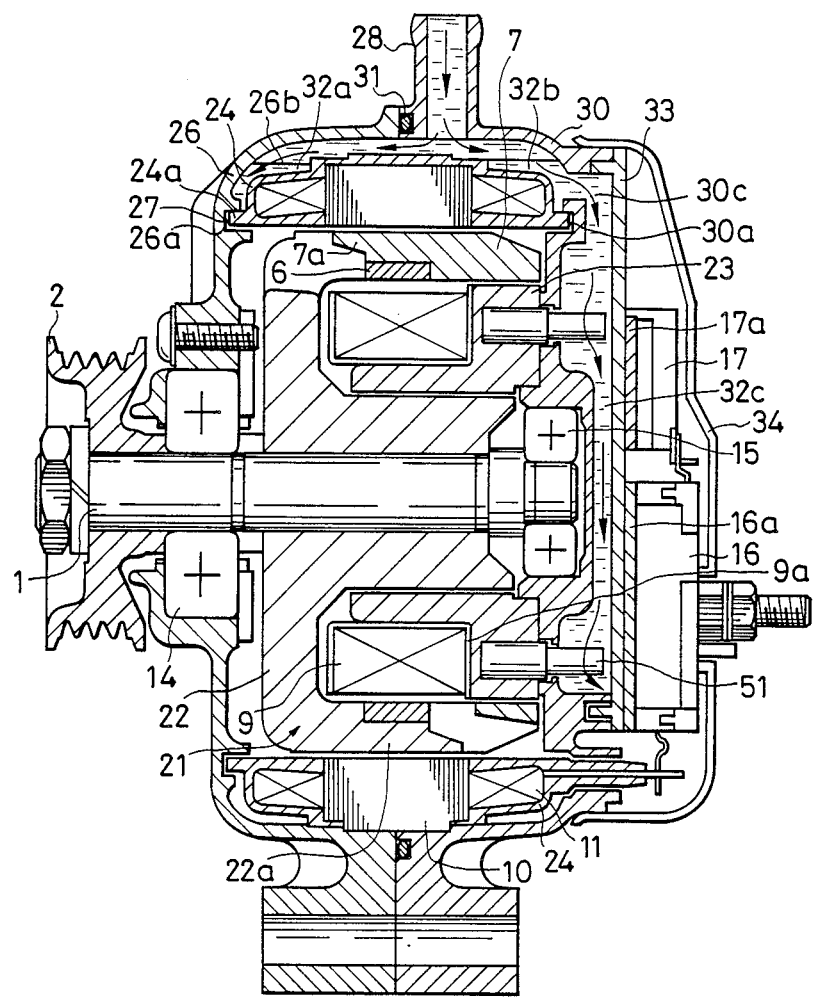

FIG. 6 shows a fourth embodiment of the invention in which one end of good thermally conductive members 51 are thermally coupled to the stationary core 23, and the other ends thereof protrude into the branch passage 32c formed between the rear bracket 30 and the cooling cover 33. With this construction, the coolant flowing through the branch passage 32c cools the rectifier 16 and the voltage regulator 17 indirectly through the cooling cover 33, and the bearing 15 and the core 23 indirectly through the rear bracket 30. Further, the core 23 and the exciting coil 9 are cooled by the thermally conductive members 51.

Figure 7:
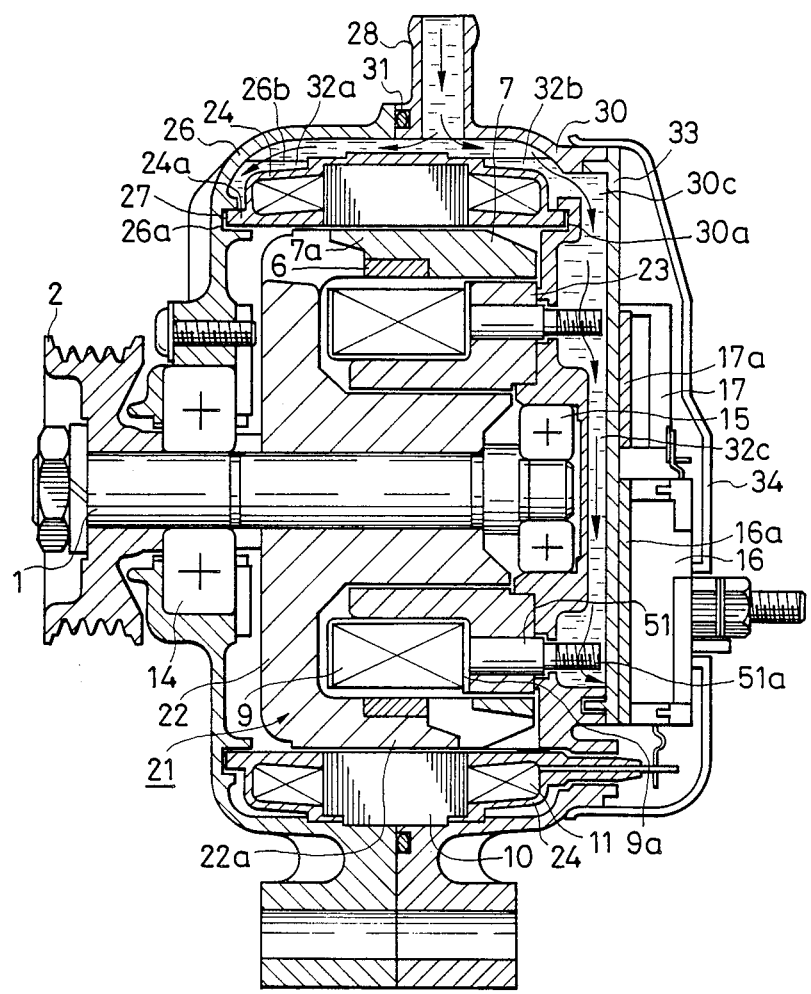

FIG. 7 is a fifth embodiment of the invention which differs from the fourth embodiment in FIG. 6 in that a plurality of heat radiating fins 51a in the form of flanges are formed on the protruded portions of the thermally conductive members 51, a bobbin 9a of the exciting coil 9 is formed of a good thermally conductive material, and end portions of the thermally conductive members 51 are pressure-contacted to the bobbin 9a to obtain a good thermal coupling therebetween. With such construction, the cooling of the exciting coil 9 becomes more effective.

It may be possible to use a so-called heat pipe composed of a metal pipe filled with a coolant which evaporates with heat and liquefies when cooled, as the thermally conductive members 51.

Figure 8:
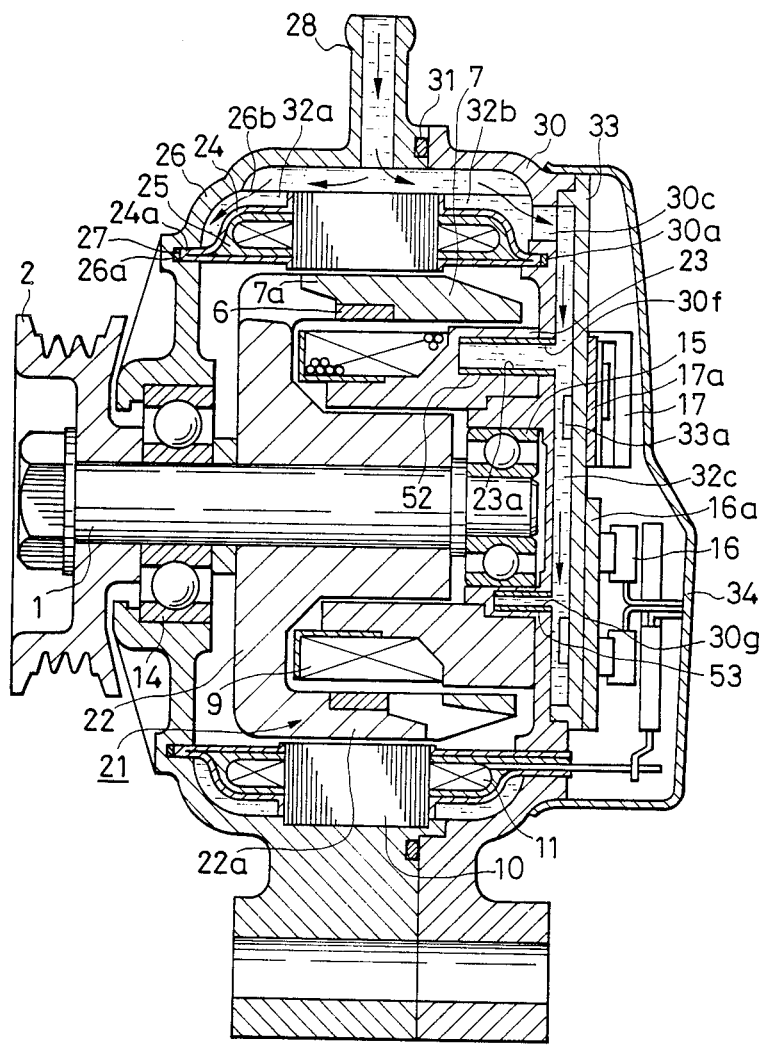
Figure 9:
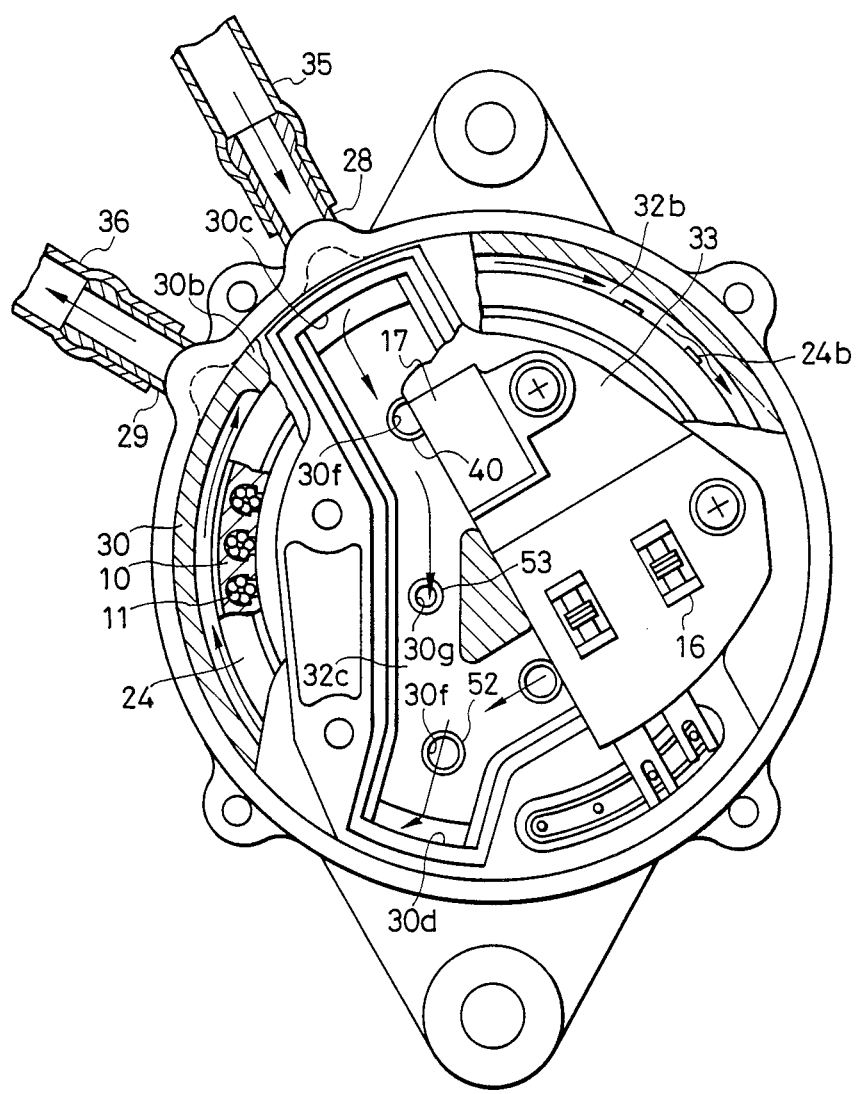
FIG. 9 is a partially cut away front view of the embodiment of FIG. 8.

FIGS. 8 and 9 show a sixth embodiment of the invention, wherein the stationary core 23 is provided in an outer end surface thereof with a blind hole 23a, and the rear bracket 30 is provided with blind holes 30f and 30g. Pipes 52 and 53 are inserted thereinto, into which a portion of the coolant flowing through passage 32c is introduced to cool the core 23 and the bearing 15 peripherally.

Figure 10:
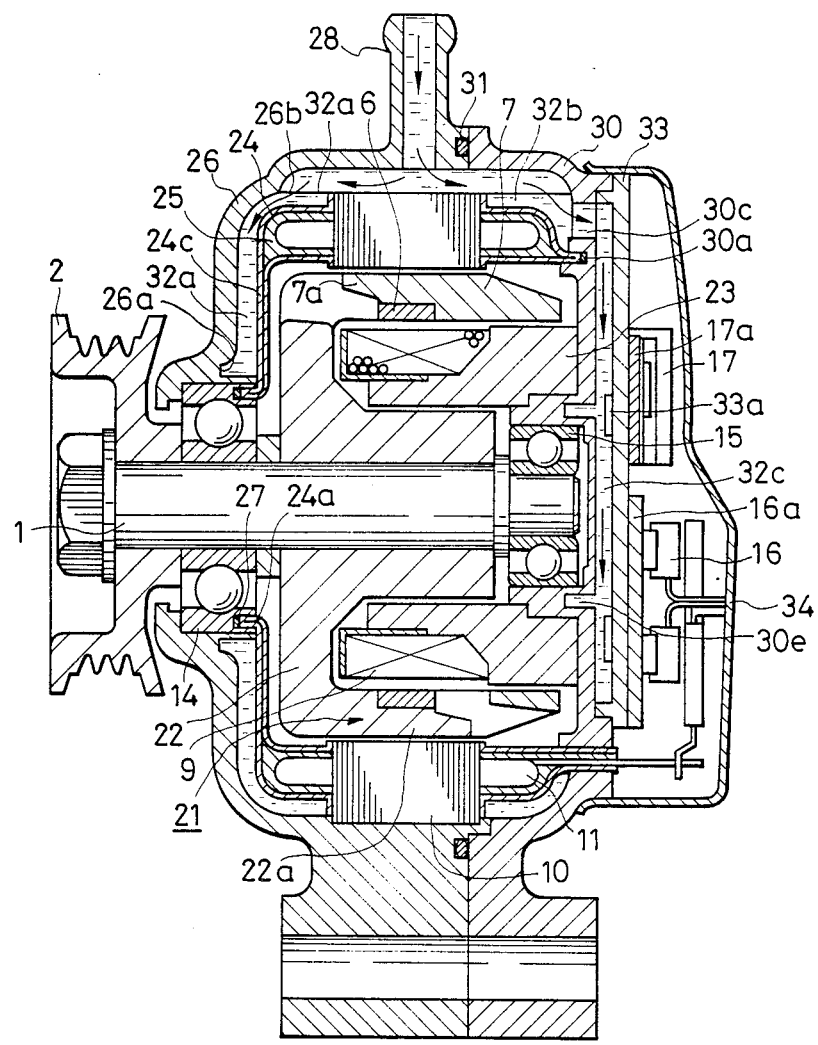
FIGS. 10 and 11 are cross sections of other embodiments of the invention.
Figure 11:
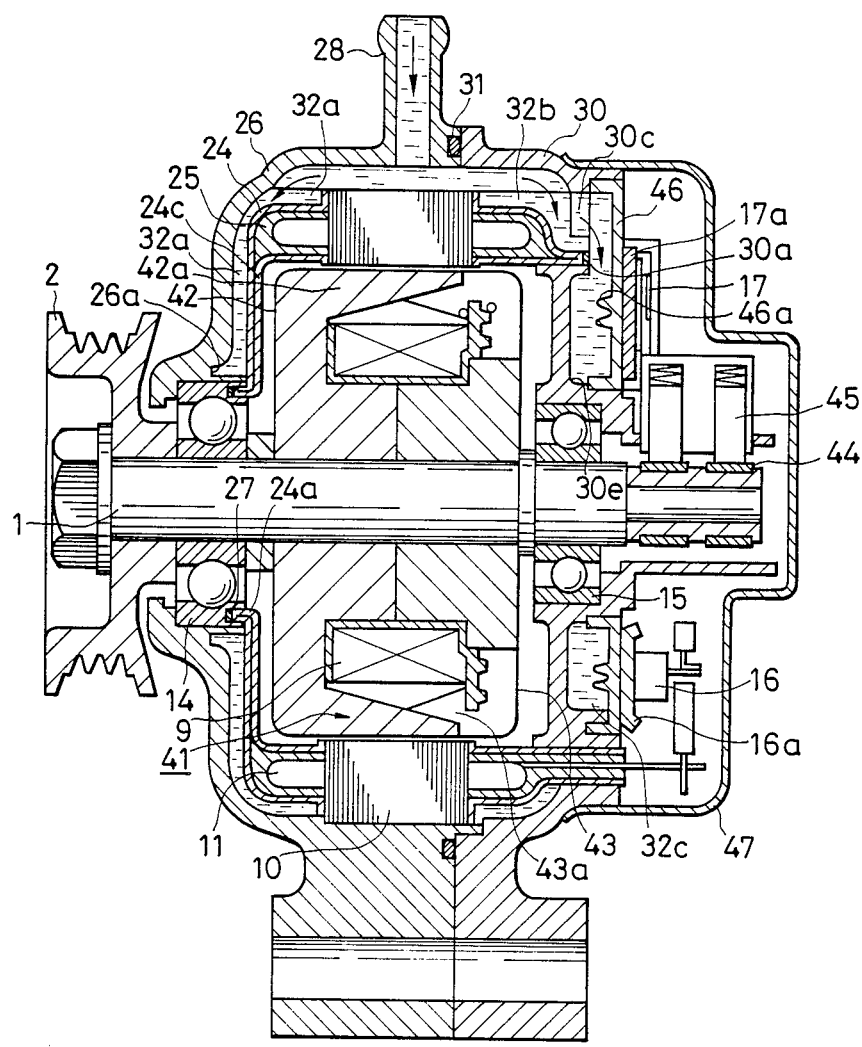

It is possible to construct the generator such that the bearings 14 and 15 supported by the front and rear brackets 26 and 30 are also cooled by the coolant as shown in FIGS. 10 and 11. In FIGS. 10 and 11, which show seventh and eighth embodiments, respectively, an end portion 24c of the enclosure 24 surrounding the stator coil 11 is radially elongated to engage with an outer peripheral end surface of the bearing 14, and the front bracket 26 is formed in an area thereof surrounding the bearing 14 with an annular recess 26a. The rear bracket 30 is formed with an annular recess 30e. The coolant is introduced into the recesses 26a and 30e to cool the bearings 14 and 15.

Figure 12:
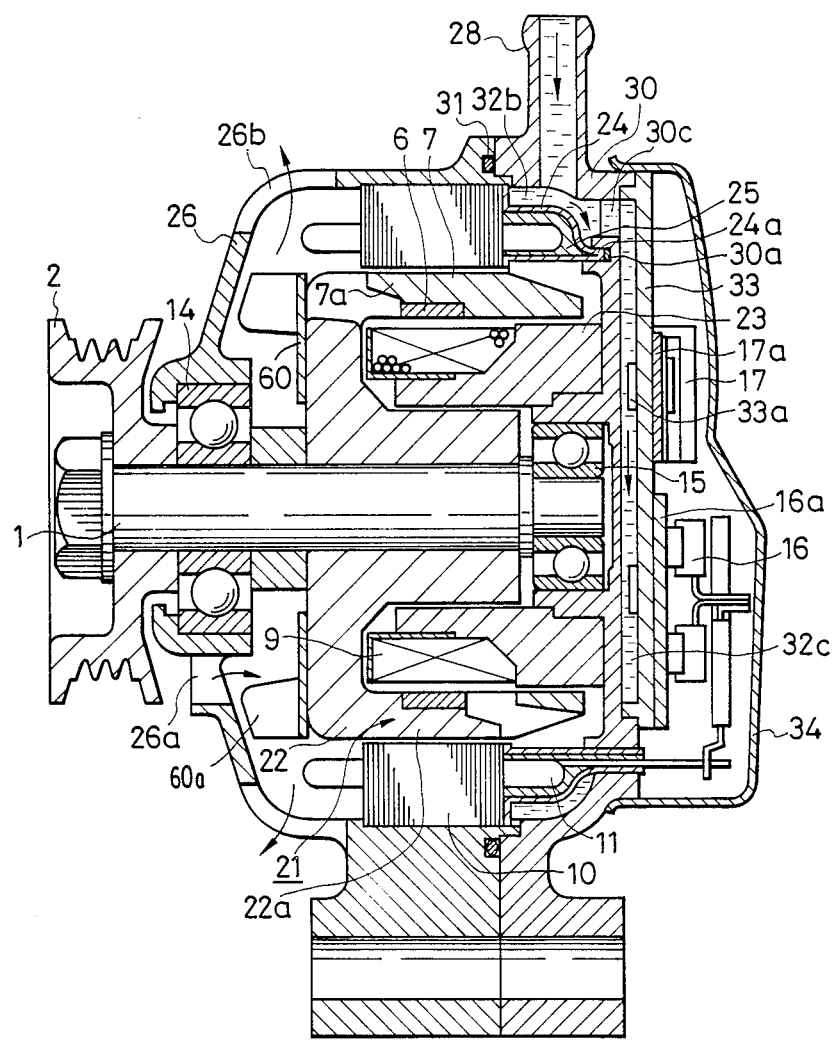
FIG. 12 is a cross section of another embodiment of the invention.

FIG. 12 shows a ninth embodiment of the invention which further includes a fan cooling system in addition to the liquid coolant system.

In FIG. 12, the rear bracket 30 is provided with a coolant inlet pipe 28 and a coolant outlet pipe, and a coolant passage 32b is formed to pass the coolant through an area of the stator coil 11 facing the rear bracket 30. The branch passage 32c for cooling the rectifier 16 and the voltage regulator 17 is also formed. The above mentioned portion of the construction of the embodiment shown in FIG. 12 is the same as that of the embodiment shown in FIGS. 2 and 3.

Figure 13:
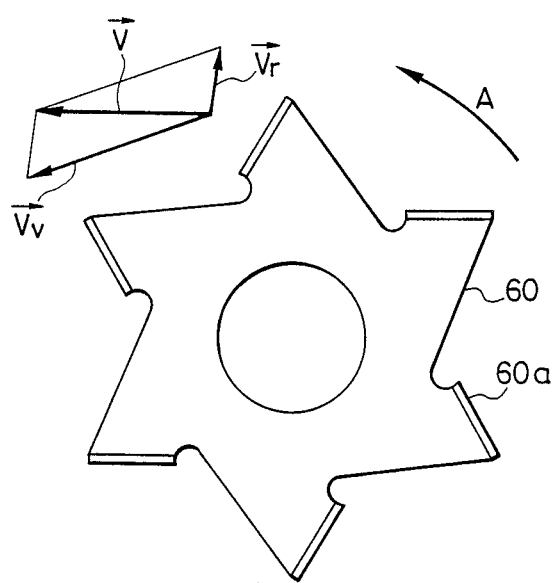
FIG. 13 is an enlarged view of a main portion of the embodiment shown in FIG. 12.

In the embodiment in FIG. 12, the front bracket 26 is formed in an area surrounding the bearing 14 with air intake holes 26a and in a peripheral area with air discharge holes 26b. A fan 60 is provided on a front end surface of the magnetic pole core 22. The fan is composed of a generally hexagonal plate having six extensions which are bent at a right angle to form fins 60a as shown in FIG. 13. Each of the fins 60a is slanted at a sweptback angle with respect to the direction of rotation A.

In operation, the fan 60 is rotated with the rotor shaft 1 driven by the vehicle engine through a belt and pulley 2 to take air through the intake holes 26a into the interior of the front bracket 26. The cooling air cools the bearing 14 and the front end of the stator coil 11, and is discharged through the discharge holes 26b.

At the same time, a portion of the low temperature liquid coolant for the vehicle engine is branched and introduced through the inlet pipe 28 into the passage 32b as shown by an arrow to cool the rear end of the stator coil 11, and is then discharged through the outlet pipe (29, not shown) to the return path of the engine coolant circulation system.

A portion of the coolant introduced through the inlet pipe 28 into the passage 32b flows through branch port 30c to branch passage 32c, to indirectly cool the rectifier 16 and the voltage regulator 17 through the cooling cover 33, and is then returned to the passage 32b.

The rear bracket 30 which is directly cooled by the liquid coolant, cools the bearing 15 and the exciting coil 9 through the stationary core 23.

The speed vector of the cooling air passing through the fins 60a of the fan 60 is Vr with respect to a rotary coordinate system fixed to the fan as shown in FIG. 13. However, the resultant vector of the cooling air leaving the fan becomes V once the relative speed vector Vv with respect to an inertial coordinate system is added as shown in FIG. 13. With the fan construction shown in FIG. 12, the absolute speed V of the cooling air is comparatively large, so that the cooling effect on the stator coil 11 becomes several times that of the conventional fan. The fan 60 can thus be small in size compared with the fan 18 shown in FIG. 1, and still provide the same cooling effect. With such a small sized fan, the noise is very small and a higher speed operation of the fan is achieved without difficulty, while providing sufficient cooling.

Thus, the stator coil 11, the rectifier 16, the voltage regulator 17 and the exciting coil 9 which are large heat generators, are effectively cooled by the air coolant and the liquid coolant.

Figure 14:
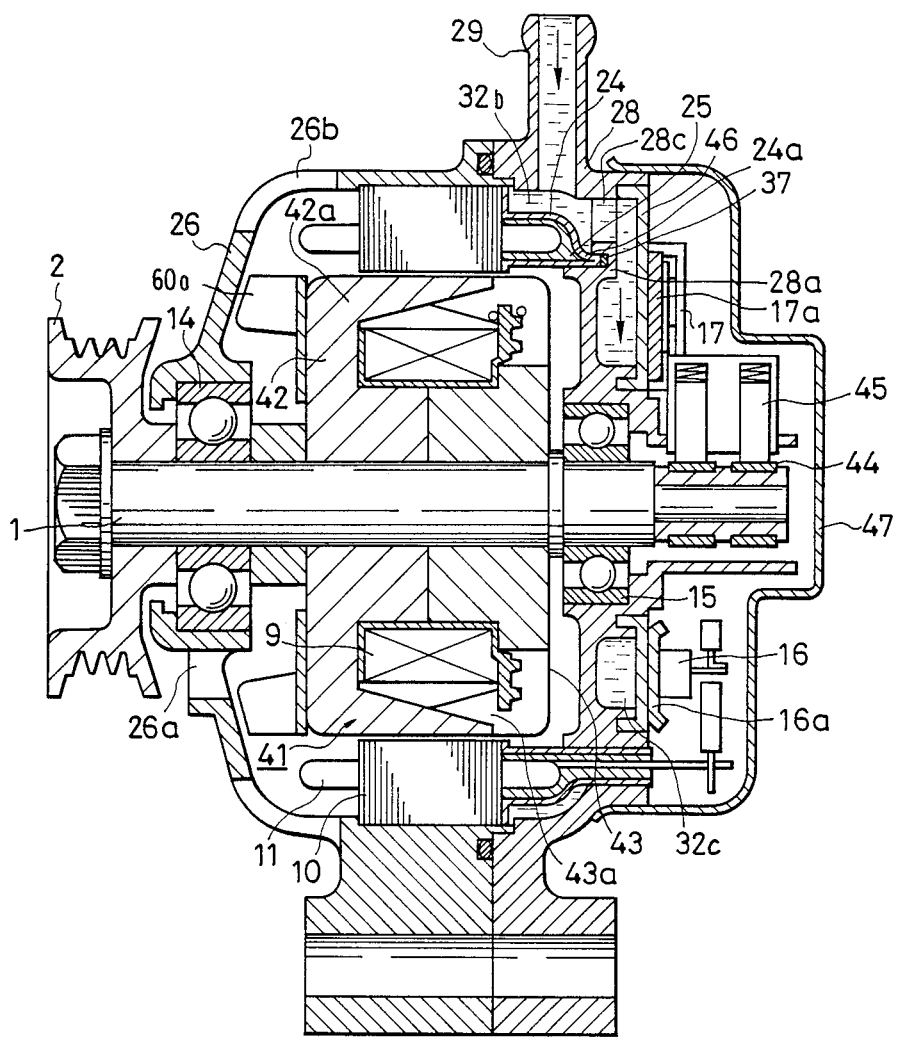
FIGS. 14 and 15 are cross sections of other embodiments of the invention.

FIG. 14 shows a tenth embodiment of the invention, similar to FIG. 12, but using a core 42, 43 and brush/slip-ring construction in accordance with the embodiment of FIG. 4.

Figure 15:
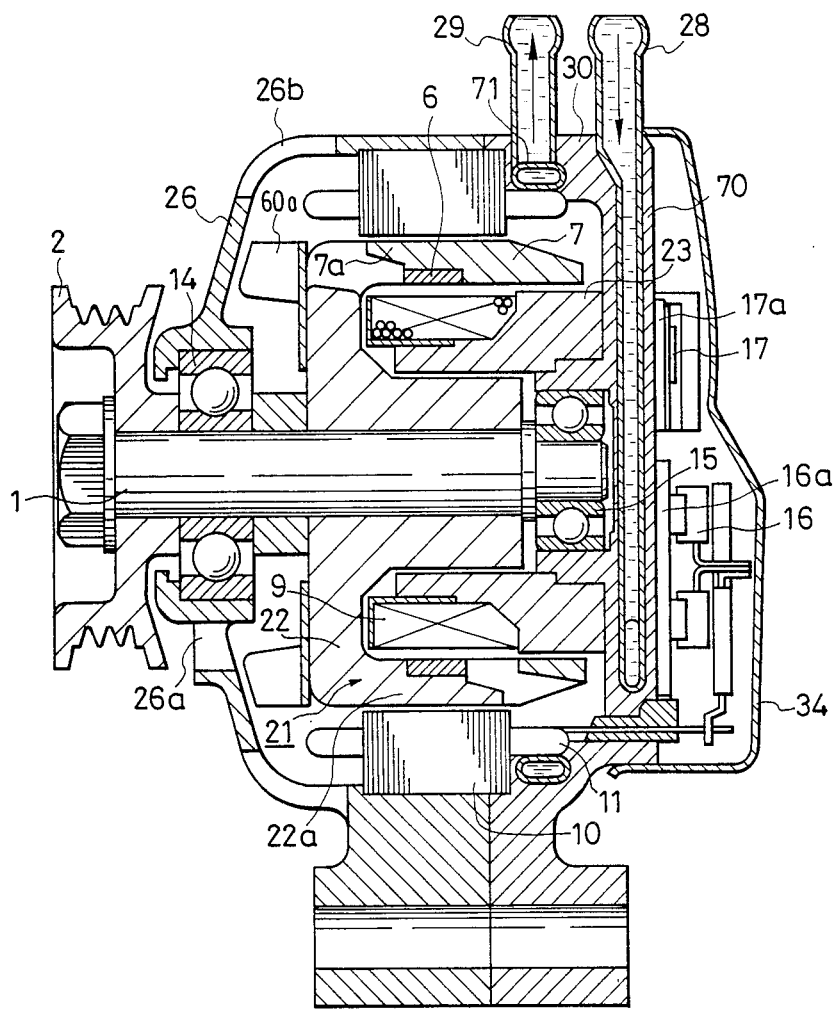
Figure 16:
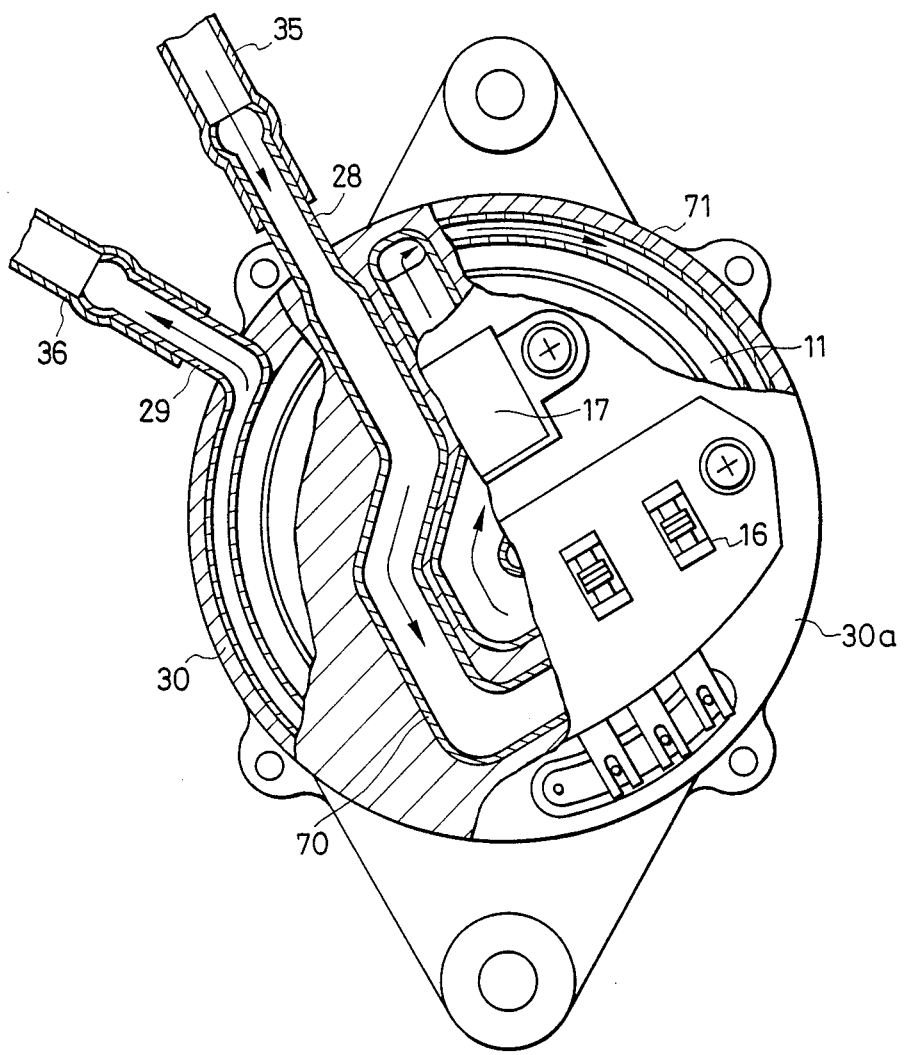
FIG. 16 is a partially cutaway front view of the embodiment shown in FIG. 15.

FIGS. 15 and 16 show an eleventh embodiment of the invention, wherein a cooling pipe 70 connected to the inlet pipe 28 is arranged around an end wall of the rear bracket 30, and a cooling pipe 71 connected to the outlet pipe 29 is arranged around a side wall of the rear bracket 30, through which cooling liquid is circulated to cool the stator coil 11, the bearing 15, the rectifier 16 and the voltage regulator 17.

As described hereinbefore, according to the present invention, the noise and energy loss due to the use of a cooling fan can be at least minimized while increasing the cooling efficiency of the generator. Further, since the generator is liquid-tightly sealed, it is possible to avoid the problems of insulation degradation due to atmosphere and other damages due to toxic gas or salt compounds.

What is claimed is:

1. A vehicle mounted a.c. generator, comprising: a rotor shaft adapted to be driven by a vehicle engine; a rotor core (22) fixedly secured to said shaft and adapted to be excited by an exciting coil (9); a stator core (10) disposed opposite an outer periphery of said rotor core and mounting a stator coil (11); a sealing member (24) enclosing at least a rear portion of the stator coil; a front bracket (26) and a rear bracket (30) sealingly joined together to define a housing supporting said stator core directly and said rotor shaft indirectly through bearings (14, 15); a rectifier (16) for rectifying an output voltage generated by said stator coil; a voltage regulator (17) for regulating an output voltage of said rectifier to a predetermined value; at least one annular coolant passage (32b) formed between said sealing member of the stator coil and said rear bracket; and a branch coolant passage (32c) formed along an end surface of said rear bracket, said stator coil, said rectifier and said voltage regulator being cooled by circulating a liquid coolant through said coolant passages.

2. The vehicle mounted a.c. generator as claimed in claim 1, wherein the sealing member comprises a metal enclosure supported by the rear bracket, and wherein said annular coolant passage is formed between said metal enclosure and said rear bracket.

3. The vehicle mounted a.c. generator as claimed in claim 1, further comprising a cooling cover (33) attached to an outer side surface of said rear bracket, said rectifier and voltage regulator being mounted on an outer peripheral surface of and said cooling cover, said branch coolant passage being formed between said rear bracket and said cooling cover.

4. The vehicle mounted a.c. generator as claimed in claim 3, further comprising annular recesses (26a, 30e) formed in an area of an inner surface of said front bracket and an area of an outer surface of said rear bracket which surround said bearings, respectively, said annular recesses being communicated with said annular coolant passages such that said bearings are cooled by liquid coolant flowing through said annular recesses.

5. The vehicle mounted a.c. generator as claimed in claim 1, further comprising at least one through hole (30c) formed in said rear bracket to communicate said annular coolant passage with said branch coolant passage.

6. The vehicle mounted a.c. generator as claimed in claim 1, wherein said liquid coolant is a portion of an engine coolant circulating through a coolant circulation system of said engine.

7. The vehicle mounted a.c. generator claimed in claim 2, further comprising a plurality of heat radiating fins (24b) protruding from said metal enclosure into said annular coolant passage.

8. The vehicle mounted a.c. generator as claimed in claim 3, further comprising a plurality of heat radiating fins (33a) protruding from said cooling cover into said branch coolant passage.

9. The vehicle mounted a.c. generator as claimed in claim 1, wherein said sealing member is made of an insulating synthetic resin material and encloses both front and rear portions of the stator coil, opposite end portions of said sealing member enclosure being liquid-tightly connected to said front and rear brackets to form two annular coolant passages (32a, 32b) individually substantially surrounding the front and rear portions of the stator coil.

10. A vehicle mounted a.c. generator, comprising: a rotor shaft adapted to be driven by a vehicle engine; a rotor core fixedly secured to said rotor shaft; an exciting coil (9) disposed opposite an inner periphery of said rotor core for magnetizing a rotor armature; a stationary core (23) for supporting said exciting coil; a stator core (10) disposed opposite an outer periphery of said rotor core and mounting a stator coil (11) thereon; a sealing member (24) enclosing at least a rear portion of the stator coil; a front bracket (26) for supporting one end of said stator core directly and said rotor shaft indirectly through a bearing (14); a rear bracket (30) for supporting the other end of said stator core and said sealing member directly and said rotor shaft indirectly through a bearing (15), said stationary core being fixedly secured to said rear bracket; a cooling cover (33) for covering a side end surface of said rear bracket to form, together with said rear bracket, a branch coolant passage (32c); a rectifier (16) mounted to an outer periphery of said cooling cover; a voltage regulator (17) mounted to said outer periphery of said cooling cover; high thermally conductive members (51) thermally coupling said stationary core through said rear bracket to said branch coolant passage; an annular coolant passage (32b) formed between said sealing member of the stator coil and said rear bracket for cooling said stator coil; said branch coolant passage cooling said rectifier, said voltage regulator and said exciting coil.

11. The vehicle mounted a.c. generator as claimed in claim 10, wherein said high thermally conductive members are pressure contacted at one ends thereof to a bobbin of said exciting coil.

12. The vehicle mounted a.c. generator as claimed in claim 10, wherein a portion of each of said high thermally conductive members in said branch coolant passage is formed with a plurality of heat radiating fins.

13. The vehicle mounted a.c. generator as claimed in claim 10, wherein each of said high thermally conductive members comprises a heat pipe.

14. A vehicle mounted a.c. generator, comprising: a rotor shaft adapted to be driven by a vehicle engine; a rotor core fixedly secured to said rotor shaft; an exciting coil (9) disposed opposite an inner periphery of said rotor core for magnetizing a rotor armature; a stationary core (23) for supporting said exciting coil; a stator core (10) disposed opposite an outer periphery of said rotor core and mounting a stator coil (11) thereon; a sealing member (24) enclosing at least a rear portion of the stator coil; a front bracket (26) for supporting one end of said stator core directly and said rotor shaft indirectly through a bearing (14); a rear bracket (30) for supporting the other end of said stator core and said sealing member directly and said rotor shaft indirectly through a bearing (15), said stationary core being fixedly secured to said rear bracket; a cooling cover (33) for covering an end surface of said rear bracket to form, together with said rear bracket, a branch coolant passage (32c) for cooling a rectifier (16) and a voltage regulator (17) mounted on said cooling cover, and said exciting coil; a coolant passage (23a) formed in said stationary core and extending through said rear bracket to said branch coolant passage; and an annular coolant passage (32b) formed between said sealing member of the stator coil and said rear bracket for cooling said stator coil.

15. The vehicle mounted a.c. generator as claimed in claim 1, further comprising a plurality of fan blades (60a) formed integrally with said rotor core and disposed around a front periphery thereof, and wherein said front bracket is formed around a bearing support portion thereof and in an outer periphery thereof with holes (26a, 26b) for passing cooling air into and out from said front bracket during rotation of said shaft.

16. The vehicle mounted a.c. generator as claimed in claim 1, further comprising coolant pipe means (70, 71) defined in said rear bracket for cooling said stator coil, said rectifier, said voltage regulator and said bearing associated with said rear bracket.

* * * * *